Nov. 7, 1933.   N. C. BREMER   1,933,653
RETAINING CLIP FOR DRIVE CHAINS
Filed Feb. 15, 1932
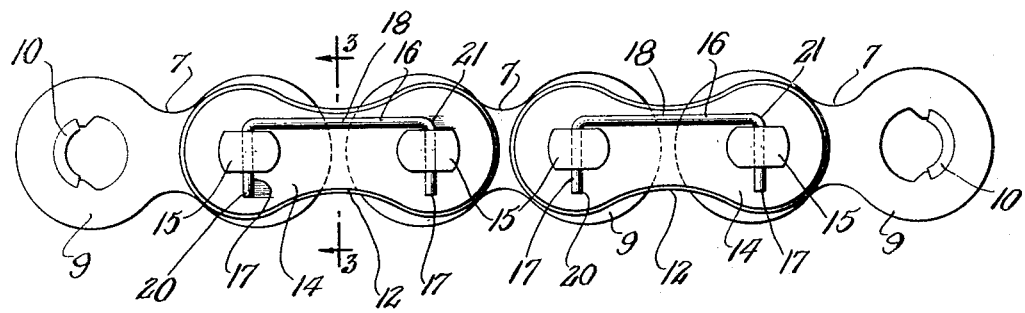
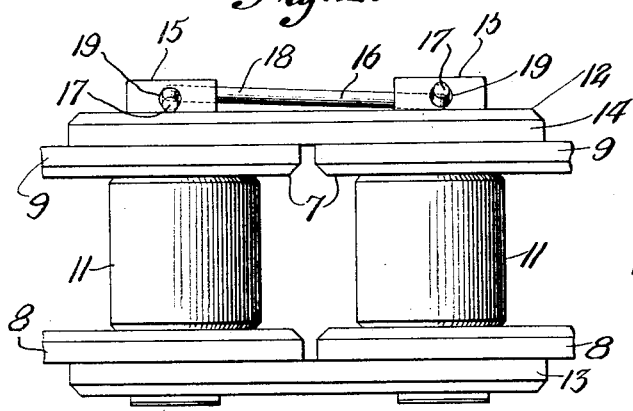
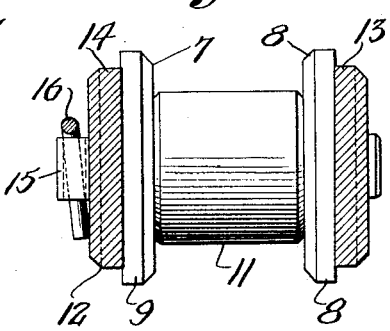
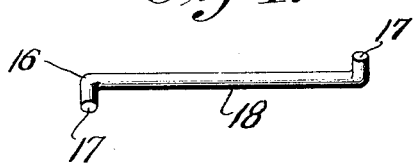
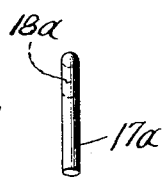
INVENTOR
Norman C. Bremer
BY
Synnestvedt & Lechner
ATTORNEYS Patented Nov. 7, 1933

1,933,653

UNITED STATES PATENT OFFICE 1,933,653

RETAINING CLIP FOR DRIVE CHAINS

Norman C. Bremer, Ithaca, N. Y., assignor to Morse Chain Company, Ithaca, N. Y., a corporation of New York Application February 15, 1932. Serial No. 592,888

5 Claims. (Cl. 74—32)

This invention relates to retaining clips for holding the pintles and links of drive chains in proper assembled relation and is particularly useful in connection with drive chains of the roller type.

A conventional method of holding the links and pintles in assembled relation is through the use of cotter pins fitting holes in the pintles at their projecting ends. Such cotter pins, however, are unsatisfactory particularly when the drive chain is operated at high speeds and I have found that the cotter pins rapidly wear out due to abrasion of the pin against the edges of the hole. I attribute this to the fact that at the point where the chain engages is sprocket, a motion is imparted to the chain at right angles in the direction to the normal path of chain travel, the amplitude and velocity of which increases inversely as the number of sprocket teeth. This motion sets up a worrying action, so to speak, of the cotter pins in their holes which finally causes breakage of the pins.

The primary object of my invention is the provision of a retaining device for chains in which such difficulties are overcome.

Another object of my invention is the provision of a retaining device or clip of very simple form, which is adapted to be quickly and easily applied to and removed from the chain and which is held firmly in place without the necessity of any operation other than its mere insertion into the holes provided therefor.

A more specific object of my invention is the provision of a resilient retaining clip for chains which is adapted to be firmly held in place by spring pressure or frictional resistance.

A further object resides in the provision of what may be termed a multiple retaining pin, in which the pin portions are substantially straight, thus overcoming difficulties such as mentioned above.

How the foregoing, together with such other objects and advantages as may hereinafter appear, or are incident to my invention, are realized, is illustrated in preferred form in the accompanying drawing, wherein—

Figure 1 is a side elevational view of a portion of a chain illustrating an application of my invention;

Figure 2 is an enlarged fragmentary bottom view of Figure 1;

Figure 3 is a cross section taken on the line 3—3 of Figure 1;

Figure 4 is a detailed view of the retaining clip shown in Figures 1 to 3;

Figure 5 is a face view of a modified form of retaining clip; and

Figure 6 is an edge view of the clip shown in Figure 5.

The chain illustrated is of the roller type and comprises in general inside or roller links 7, each composed of a pair of link plates 8 and 9, segmental connecting members 10, and loose rollers 11 surrounding the members 10; outside connecting links 12 each composed of a pair of link plates 13 and 14; and pintle pins 15 which are secured in the outside link plates 13 and which extend thru and beyond the opposite outside link plates 14. The pintle pins 15 pass thru the rollers 11 and cooperate with the segmental connecting members 10 to form the joints of the chain.

In order to hold the links in proper assembled relation, I employ retaining devices or clips 16 which are of very simple form and adapted to be quickly and easily applied to or removed from the chain.

The clips are made of resilient metal such as tempered spring steel wire and are of substantially U-shape, the legs of which are indicated by the reference numerals 17 and the connecting portion by the reference numeral 18. The legs of the clips are spaced apart a distance substantially equal to the spacing of the transverse receiving holes 19 therefor which are provided in the projecting end portions of the pintle pins 15.

In the form of my invention illustrated in Figures 1 to 4, the legs of the clips are disposed in twisted relation to each other, i. e., the right-hand leg as viewed in Figure 4 is bent away from the connecting portion in one direction and the left-hand portion is bent away in the other direction.

It will thus be seen that when the clip is inserted into the holes of the pair of pintles of an outside link and pushed into its retaining position, it is deflected due to the twisted relation of the legs. In this connection it is to be noted that the holes 19 are of somewhat larger diameter than the diameter of the wire.

The amount of twist or offset of the legs is such that the deflection will not exceed the elastic limit of the steel but is sufficient to cause the deflection to exert considerable sidewise thrust against the outside link plate due to the pressing action of the wire at the points 20 and 21 indicated in Figure 1. The frictional resistance or spring pressure thus created is of an amount which will prevent any motion of the wire with respect to the pintle pins or side plates so that they are firmly held in place. While the pins are thus held against unintended displacement they may nevertheless be easily removed without being destroyed or weakened.

It is also pointed out that the legs of the clips are substantially straight and therefore are not subjected to any worrying action such as mentioned hereinbefore and they will last indefinitely. In fact actual tests over long periods under heavy load conditions at high speeds, clips constructed in accordance with my invention did not shown any signs of wear while pins of the cotter type under the same conditions, broke off.

While I have shown the connecting portion 18 of the clips illustrated in Figures 1 to 4 as being straight, I also contemplate making them of arch form as illustrated in Figure 5. Such an arch between the legs forms a spring which permits the clip to accommodate itself to variations in the spacing of the holes in the pintle pins.

Referring now to the form of clip illustrated in Figures 5 and 6 it will be seen that the legs 17a and the connecting portion 18a lie in the same general plane, i. e., the legs are not bent out of the general plane of the clip as they are in the first form. However, the legs are bent at an angle, i. e., they diverge outwardly from the connecting or body portion 18a, although it is to be understood that I also contemplate disposing the legs in converging relation.

The connecting portion 18a is preferably of arch shape as illustrated, so that when the clips are assembled in the pintle pins the legs may be made to enter the holes in the pins by means of the spring action of the portion 18a and the clips are firmly held in place due to the spring pressure thus obtained.

While I prefer to employ straight legs, it may be desirable in some instances to curve them slightly as illustrated in Figure 5, it being noted that the curvature is not sufficient to cause the legs to be subjected to wear from the worrying action above referred to.

It will be seen from the foregoing that my improved clip is self-retaining and that the only operation necessary in applying it to the chain is to push it into the pintle holes. In removing it it is merely slipped out of the holes without any preliminary operations.

I claim:

1. In a drive chain, the combination with links and pintle pins connecting the links having clip receiving apertures therein, of clips adapted to retain adjacent pairs of pintle pins and the associated links in operative relation, each clip consisting of a tempered metal wire of U-form the legs of which are normally disposed out of parallel relation to each other, whereby the clips when inserted in the apertures of the pairs of pintle pins are deflected into parallel relation and thereby put under tension to be spring pressure held against unintended displacement.

2. In a drive chain, the combination with links and pintle pins connecting the links having clip receiving apertures therein, of clips adapted to retain adjacent pairs of pintle pins and the associated links in operative relation, each clip consisting of a tempered metal wire of U-form the legs of which are normally in twisted relation to each other whereby a torsional deflection of the clips in a direction transverse of the links is effected when they are inserted in the apertures of the pairs of pintle pins.

3. In a drive chain, the combination with links and pintle pins connecting the links having clip receiving apertures therein, of clips adapted to retain adjacent pairs of pintle pins and the associated links in operative relation, each clip consisting of a tempered metal wire of U-form the legs of which are disposed out of parallel relation to each other and the leg connecting portion of which is of arch shape, whereby the clips when inserted in the apertures of the pairs of pintle pins are deflected into parallel relation and thereby put under tension to be spring pressure held against unintended displacement.

4. In a drive chain, the combination with links and pintle pins connecting the links having clip receiving apertures therein, of clips adapted to retain adjacent pairs of pintle pins and the associated links in operative relation, each clip consisting of a tempered metal wire the end portions of which are so relatively disposed that the clip must be deflected for insertion in the apertures of a pair of adjacent pintle pins an amount sufficient to spring pressure hold the wire in place and to exert pressure on the links in a transverse direction.

5. In a drive chain of the roller type having roller links, outside link plates, and connecting pintle pins secured in one set of outside link plates and projecting beyond the other set of outside link plates, said pintle pins having transverse retaining pin receiving holes in the projecting portions, the combination of a multiple retaining pin of tempered metal wire having substantially straight pin portions spaced apart a distance substantially equal to the spacing of the transverse apertures of adjacent pintle pins, said pin portions being normally disposed out of parallel relation and being drawn into substantially parallel relation corresponding to the parallel relation of the apertures in the pintle pins when inserted in place in said apertures.

NORMAN C. BREMER.